United States Patent
Tanaka (10) Patent No.: US 6,647,026 B1
(45) Date of Patent: Nov. 11, 2003

(54) FRAME PHASE SYNCHRONOUS SYSTEM AND A METHOD THEREOF

(75) Inventor: Hironao Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/401,182

(22) Filed: Sep. 23, 1999

(30) Foreign Application Priority Data

Sep. 24, 1998 (JP) ............................................ 10-269892

(51) Int. Cl.[7] ................................................. H04L 7/04
(52) U.S. Cl. ........................................ 370/509; 370/519
(58) Field of Search ................................. 370/503, 506, 370/509, 510, 512, 516, 519, 328; 375/368, 224, 354, 362, 365

(56) References Cited

U.S. PATENT DOCUMENTS

| | | | |
|---|---|---|---|
| 4,811,365 A | 3/1989 | Manno | 375/107 |
| 5,963,605 A | * 10/1999 | Yasui | 375/368 |
| 6,373,834 B1 | * 4/2002 | Lundh et al. | 370/350 |

FOREIGN PATENT DOCUMENTS

| | | |
|---|---|---|
| EP | 0 718 995 | 6/1996 |
| EP | 0 776 104 | 5/1997 |
| JP | 3-270440 | 12/1991 |
| JP | 7-46659 | 2/1995 |
| JP | 7-131853 | 5/1995 |
| JP | 9-46325 | 2/1997 |

* cited by examiner

Primary Examiner—Kenneth Vanderpuye
(74) Attorney, Agent, or Firm—Foley & Lardner (57) ABSTRACT

A frame phase synchronous system, which is accurate with a simple configuration for adjusting phase synchronization in a digital mobile communications system, is provided. A relay node measures a frame phase difference with respect to other relay nodes and obtains an optimum shift value as a first shift value, which is used for adjusting the phase in the relay node and for notifying to a switching node connected as a slave. The switching node measures a frame phase difference with respect to said host relay node and a frame phase difference with respect to a base station node as the slave, and obtains a second shift value by adding the first shift value to a shift value derived from the measured frame phase difference with respect to the host relay node for adjusting the phase in the switching node, and also obtains a third shift value by adding the second shift value to a shift value derived from the measured frame phase difference with respect to the base station node for notifying the third shift value to the base station node. The base station node adjusts the phase by the third shift value notified by the host switching node.

7 Claims, 6 Drawing Sheets

Fig.6

FRAME PHASE SYNCHRONOUS SYSTEM AND A METHOD THEREOF

BACKGROUND OF THE INVENTION

1. Technical Field of the Invention

The present invention relates to a frame phase synchronous system for adjusting phase synchronization between respective nodes such as relay nodes, switching nodes and base station nodes in a digital mobile communications system and, more particularly, to a frame phase synchronous system for measuring a frame phase difference by using a loop-back function of an ATM (ASYNCHRONOUS TRANSFER MODE) cell and independently matching the frame phases between the individual nodes.

2. Description of the Related Art

As a system for matching the frame synchronization between the nodes within the network, there is a master-slave synchronous system for realizing frequency synchronization between a master device and a slave device, wherein the master device transmits a transmission signal which is synchronized with a reference frequency of a reference clock in the master device, and the slave device extracts a clock signal from the received transmission signal and makes an oscillator of the device itself synchronized in phase with it.

Further, there is a mutual synchronous system which measures phase differences between own node and all other nodes and transfers the measuring results to other nodes, thus obtaining an average of the phase differences between all nodes, then setting this average to the frame phase of the own node, and thereby making the frame phase synchronization.

In a conventional digital mobile communications system, a master-slave synchronous system is applied in which a master node supplies a frame phase synchronous signal to switching nodes and base station nodes in the network via an STM (SYNCHRONOUS TRANSFER MODE) network. There arises, however, such a problem that a synchronizing accuracy can not be set to under 125 $\mu$sec. at the minimum in terms of such a condition that the STM network be used. This is because it is prescribed in the STM network that the synchronization is executed by using one bit determined in one time slot, and hence the synchronizing accuracy can not be set to a one time slop length (125 $\mu$sec.) or under.

Further, it is required in the mutual synchronous system that a path for matching the time be formed for all the nodes, and a device for calculating the phase difference is also needed, resulting in such a problem that the construction of each node becomes intricate.

SUMMARY OF THE INVENTION

A frame phase synchronous system according to the present invention is characterized by having the following constructions in order to solve the problems described above.

A frame phase synchronous system for adjusting phase synchronization in a digital mobile communications system comprises: a relay node which measures a frame phase difference with respect to other relay nodes using a method of calculating a frame phase difference from a propagation delay time through ATM cell loop-back, also obtains an optimum shift value as a first shift value for adjusting the phase synchronous in the relay node, and for notifies the first shift value to a switching node connected to as a slave; a switching node which measures a frame phase difference with respect to the host relay node and a frame phase difference with respect to a base station node as the slave, obtains a second shift value by adding the notified first shift value to a shift value derived from the measured frame phase difference with respect to the host relay node for adjusting the phase synchronous in the switching node, and also obtains a third shift value by adding the second shift value to a shift value derived from the measured frame phase difference with respect to the base station node as the slave for notifying the third shift value to the base station node; and a base station node which adjusts the phase synchronous by the third shift value notified by the host switching node.

Also, the relay node further comprises: a first frame phase difference adjusting unit which measures a frame phase difference with respect to other relay nodes, and obtains an optimum shift value as a first shift value for adjusting the phase synchronous in the relay node; and a first shift value notifying unit which notifies the first shift value to the switching node accommodated as a slave.

The switching node further comprises: a frame phase difference measuring unit which measures a frame phase difference with respect to the host relay node and a frame phase difference with respect to the base station node as the slave; a second frame phase difference adjusting unit which obtains a second shift value by adding the notified first shift value to a shift value derived from the measured frame phase difference with respect to the host relay node for adjusting the phase synchronous in the switching node; and a third frame phase difference adjusting unit which obtains a third shift value by adding the second shift value to a shift value derived from the measured frame phase difference with respect to the base station node accommodated as the slave for notifying the third shift value as an shift value to be adjusted in the base station node.

A method of frame phase synchronous in a digital mobile communications system, in which a plurality of relay nodes, switching nodes as slave nodes of the relay node, and base station nodes as slave nodes of the switching node are provided, according to the present invention is characterized by having the following constructions:

(1) measuring a frame phase difference, in the relay node, with respect to other relay nodes using a method of calculating a frame phase difference from a propagation delay time through ATM cell loop-back;

(2) obtaining an optimum shift value as a first shift value for adjusting the phase synchronous in the relay node;

(3) notifying the first shift value from the relay node to a switching node connected as a slave;

(4) measuring a frame phase difference, in the switching node, with respect to the host relay node and a frame phase difference with respect to a base station node as the slave using a method of calculating a frame phase difference from a propagation delay time through ATM cell loop-back;

(5) obtaining a second shift value, in the switching node, by adding the notified first shift value to a shift value derived from the measured frame phase difference with respect to the host relay node for adjusting the phase synchronous in the switching node;

(6) obtaining a third shift value, in the switching node, by adding the second shift value to a shift value derived from the measured frame phase difference with respect to the base station node as the slave for notifying of the third shift value the base station node; and (7) adjusting the phase synchronous, in said base station node, by the third shift value notified by the host switching node.

DETAILED DESCRIPTION OF PREFERRED EMBODIMENTS

Figure 1:
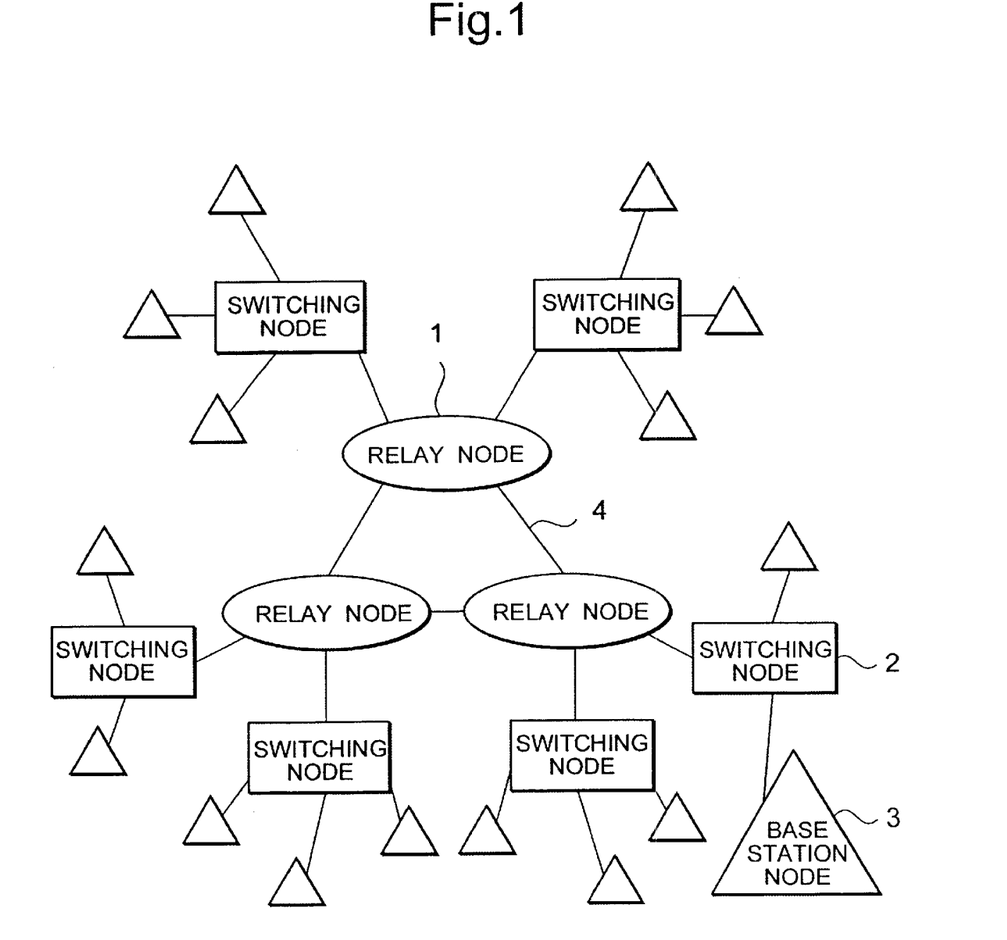
FIG. 1 is a diagram showing an example of architecture of a mobile communications network.

An architecture of a digital mobile communication system in one embodiment of the present invention will be explained referring to FIG. 1.

Construction of the Whole

In the present invention, respective nodes such as a relay node 1, a switching node 2 and a base station node 3 are connected via an ATM transmission line 4, and all the nodes establish clock synchronization. The base station node 3 is a radio base station for providing radio service area for mobile nodes. The switching node 2 is a mobile switching center for switching calls to/from mobile nodes through the radio base station, and controls radio base stations for the mobile communication. The relay node 1 is also a mobile switching center, but only handles relaying traffic in the mobile communication network. The relay node 1 can be a gateway switching center to interface with other communication network such as a fixed communication network.

All the relay nodes are connected each other with a mesh type connection by the ATM transmission lines. The relay node and a plurality of switching nodes accommodated in the relay node are also connected via the ATM transmission lines. Further, each of the switching nodes accommodates a plurality of base station nodes.

Construction of Relay Node

Figure 2:
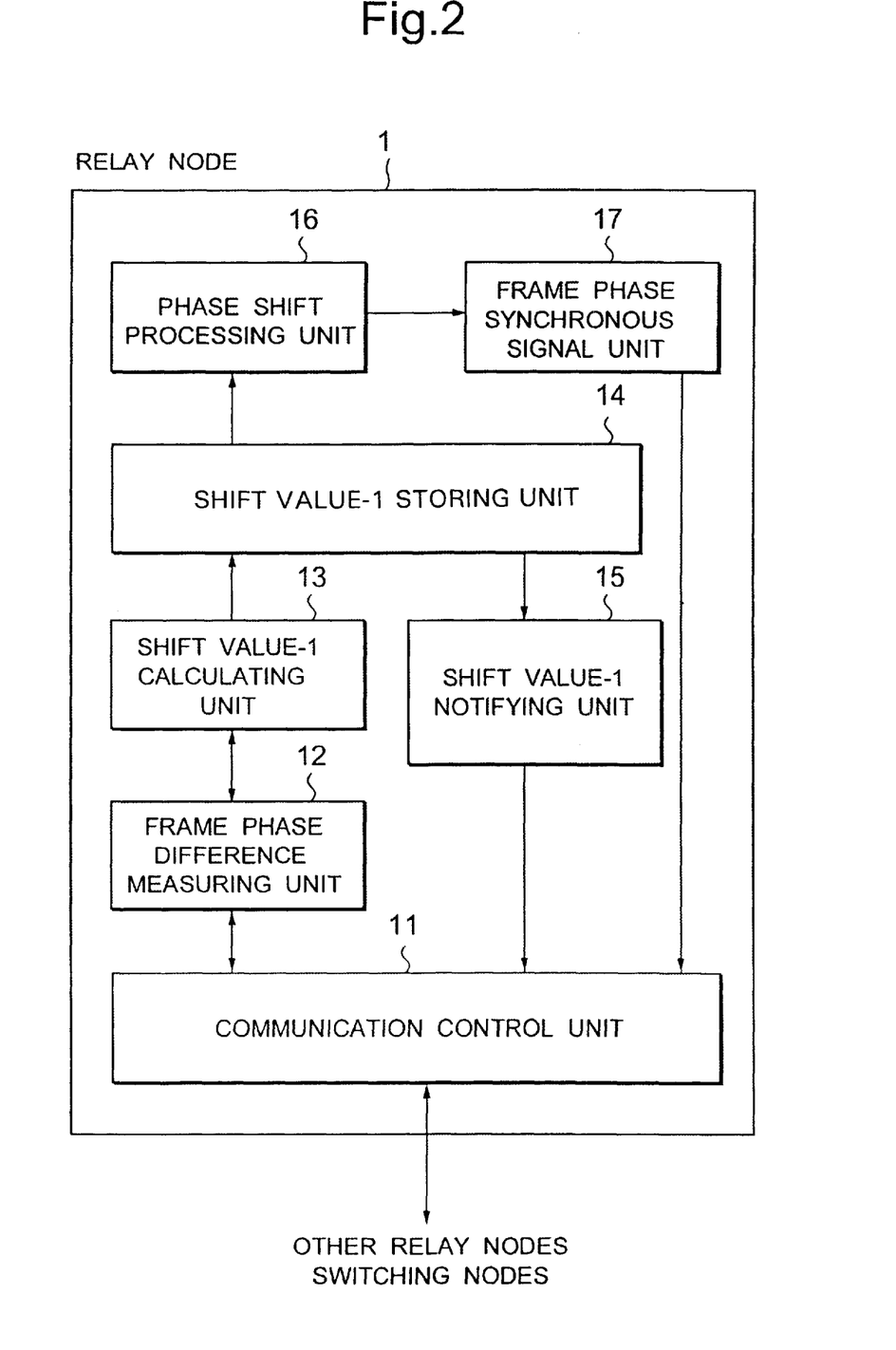
FIG. 2 is a block diagram showing a construction of a frame phase synchronous part in a relay node according to the present invention.

Next, a construction of the relay node 1 according to the present invention will be described with reference to FIG. 2.

Each relay node includes a communication control unit 11 for performing communications with other relay nodes and with the switching nodes accommodated therein as slaves. Further, the relay node includes a frame phase difference measuring unit 12 for measuring a frame phase difference between the relay nodes by using an ATM cell loop-back function, a shift value-1 calculating unit 13 for calculating a shift value-1 on the basis of an average value of the frame phase differences from other relay nodes which have been measured by the frame phase difference measuring unit, and a shift value-1 storage unit 14 for storing the calculated shift value-1. Moreover, the relay node includes a shift value-1 notifying unit 15 for notifying of the shift value-1 the switching nodes accommodated therein as the slaves, and a phase shift processing unit 16 for executing a phase shift of the relay node itself in accordance with the shift value-1.

Furthermore, the relay node includes a frame phase synchronous signal device 17 for retaining clock synchronization established within the system.

Construction of Switching Node

Figure 3:
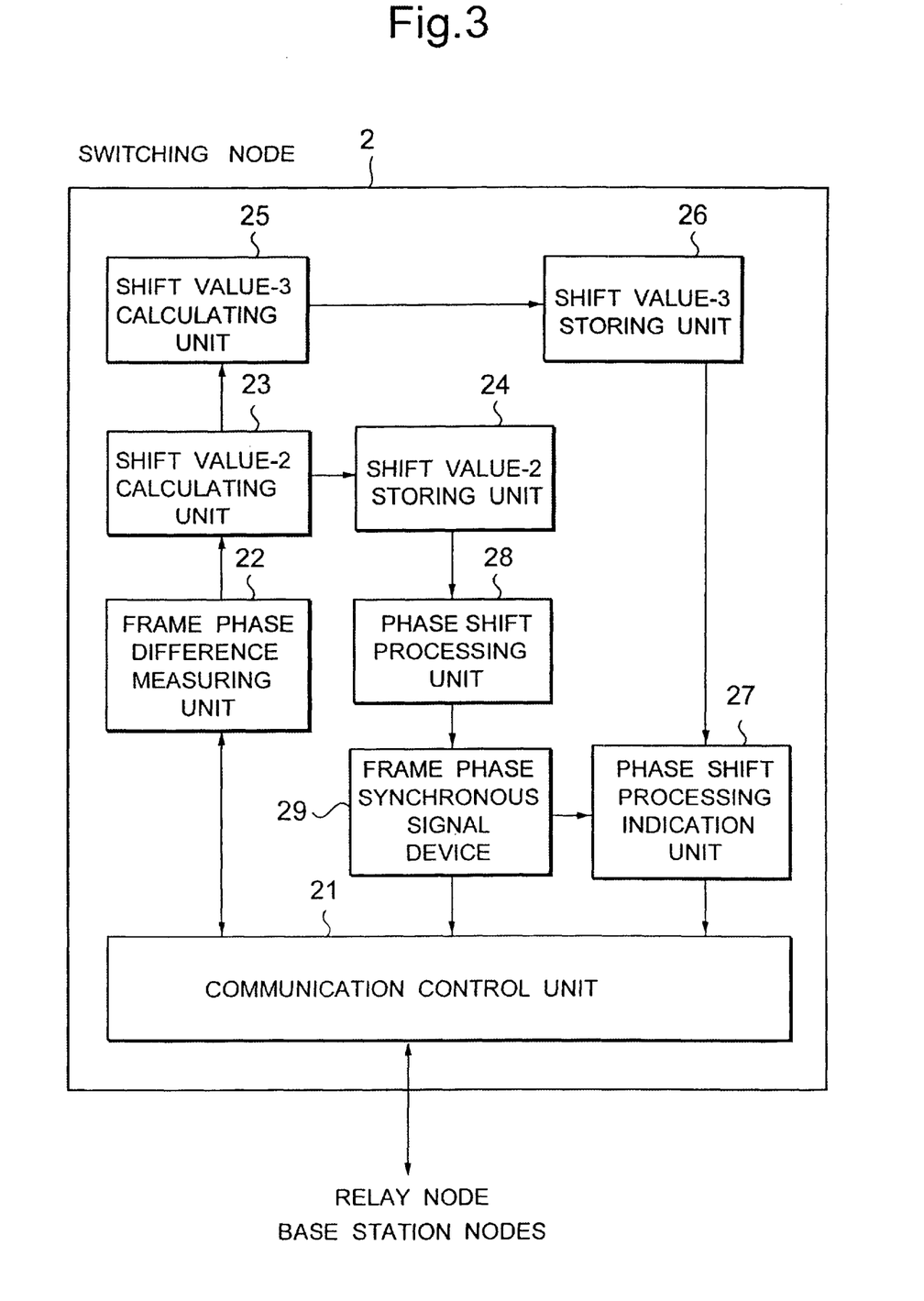
FIG. 3 is a block diagram showing a construction of a frame phase synchronous part in a switching node according to the present invention.

Next, a construction of the switching node 2 according to the present invention is explained referring to FIG. 3.

Each of the switching nodes includes a communication control unit 21 for implementing communications with the host relay node and the base station nodes accommodated therein as slaves. Further, the switching node includes a frame phase difference measuring unit 22 for measuring frame phase differences between the host relay node and the switching node itself and between the switching node itself and all the base station nodes accommodated therein as the slaves by using the ATM cell loop-back function. Furthermore, the switching node includes a shift value-2 calculating unit 23 for calculating a shift value-2 by adding the shift value-1 of which the host relay node has notified to the frame phase difference between the host relay node and the switching node itself which has been measured by the frame phase difference measuring unit, and a shift value-2 storage unit 24 for storing the calculated shift value-2.

On the other hand, the switching node includes a shift value-3 calculating unit 25 for calculating a shift value-3 per base station by adding the shift value-2 to the frame phase difference between the switching node itself and the all the base station nodes accommodated therein as the slaves which has been measured by the frame phase difference measuring unit, a shift value-3 storage unit 26 for storing the calculated shift value-3, and a phase shift processing indication unit 27 for giving an indication to execute a phase shift as well as notifying each base station node as the slave of the shift value-3.

Moreover, the switching node includes a phase shift processing unit 28 for executing a phase shift of the switching node itself in accordance with the shift value-2. Furthermore, the switching node includes a frame phase synchronous signal device 29 for retaining the clock synchronization established within the system.

Construction of Base Station Node

Figure 4:
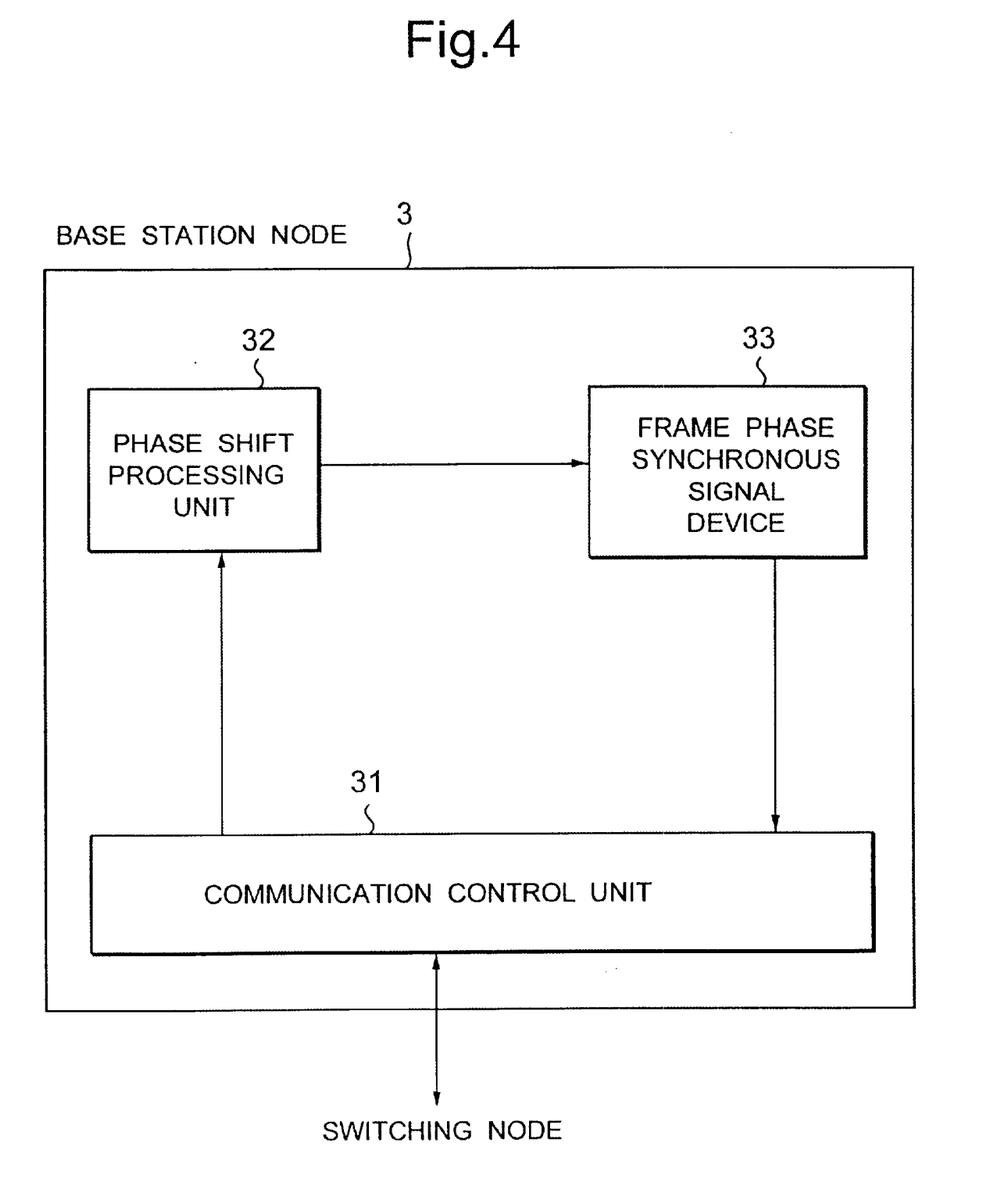
FIG. 4 is a block diagram showing a construction of a frame phase synchronous part in a base station node according to the present invention.

Next, a construction of the base station node 3 according to the present invention will be explained referring to FIG. 4.

Each of the base station nodes includes a communication control unit 31 for implementing communications with the host relay node. Further, the base station node includes a phase shift processing unit 32 for executing a phase shift of the base station node itself in accordance with the shift value-3 of which the host switching node has notified. Furthermore, the base station node includes a frame phase synchronous signal device 33 for retaining the clock synchronization established within the system.

Explanation of Operation

Figure 5:
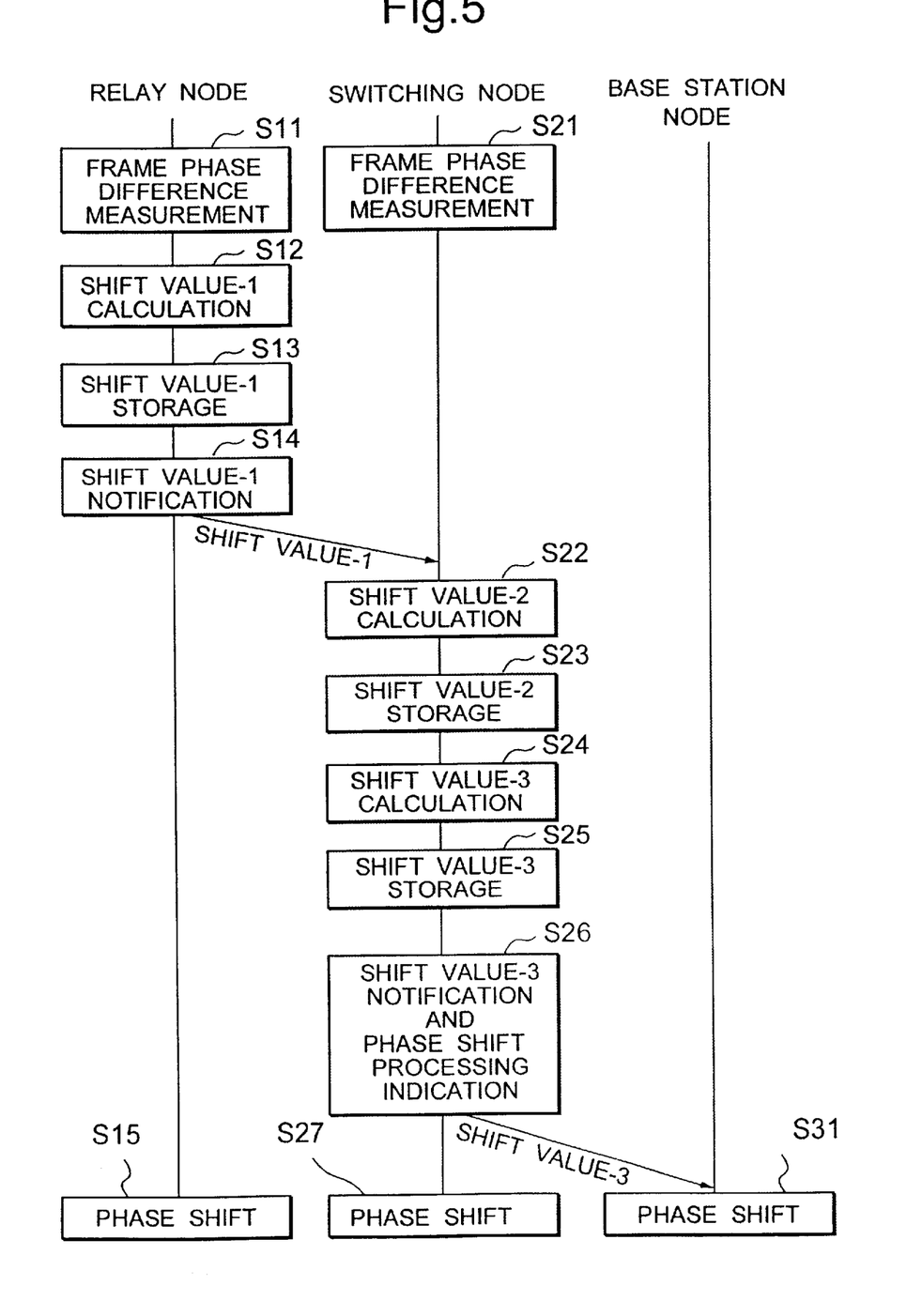
FIG. 5 is a sequence diagram showing a procedure of executing a phase shift according to the present invention.

An operation of the frame phase synchronous system according to the present invention will hereinafter be described with reference to FIG. 5.

To start with, the relay node 1 and the switching node 2 measure frame phase differences between the respective nodes such as between the respective relay nodes, between the relay node and the switching node, and between the switching node and the base station node (S11, S21). The relay node 1 measures, based on the ATM cell loop-back, the frame phase difference with respect to other relay nodes, and the switching node measures, based on the ATM cell loopback, the frame phase differences with respect to the host relay node and with all the base station nodes as the slaves. This frame phase difference measurement will hereinafter be explained in greater details referring to FIG. 6.

Figure 6:
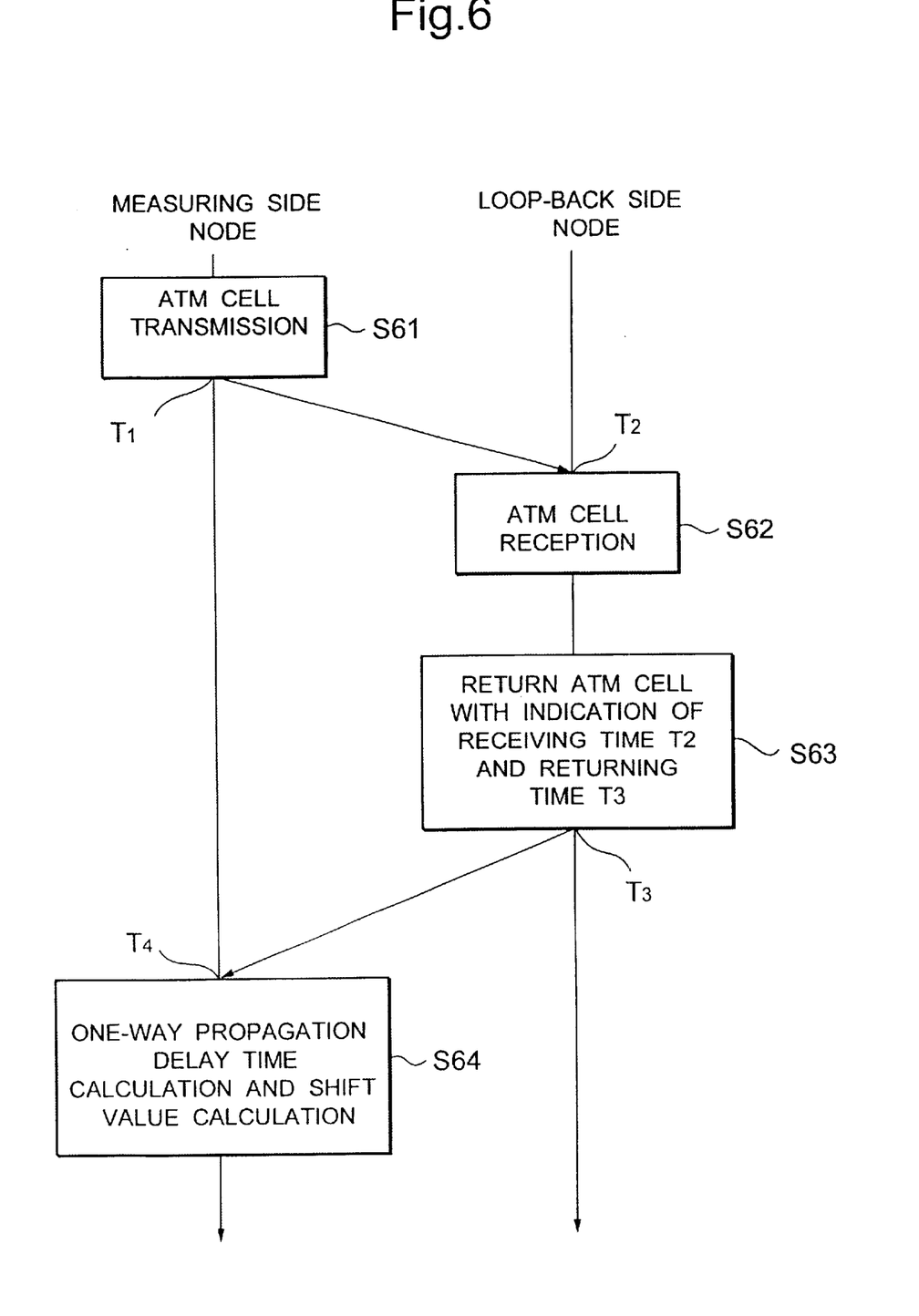
FIG. 6 is a sequence diagram showing a one-way propagation delay time measurement using an ATM cell loop-back.

To begin with, the measuring side node writes a time T1 to a time data segment of the ATM cell for indicating the time when the cell is transmitted, and transmits this ATM cell to a loop-back side node via the communication control unit (11 or 21) from the frame phase difference measuring unit (12 or 22) (S61). The loop-back side node, upon receiving the ATM cell transmitted from the measuring side node (S62), writes a receiving time (T2) and a send-back time (T3) of the same cell to the time data segment of the received cell, and sends the cell back to the measuring side node at the time T3 (s63). The measuring side node, upon receiving the cell looped back, records a receiving time T4 (S64). Next, the frame phase difference measuring unit (12 or 22) calculates a one-way propagation delay time between the measuring side node and the loop-back side node from the obtained data (S65) The one-way propagation delay time dm is obtained by an average of T2−T1 and T4−T3. Further, the frame phase difference is calculated. Herein, if there is no frame phase difference between the measuring side node and the loop-back side node, the ATM cell transmitted at the time T3 in the loop-back side node is to be received by the measuring side node at time T3+dm after the one-way propagation delay time dm has elapsed. Namely, the ATM cell receiving time T4 in the measuring side node must be equal to T3+dm. Accordingly, if the frame phase of the measuring side node is not coincident with the frame phase in the loop-back side node, the frame phase difference is obtained by T4−T3−dm.

This frame phase difference measurement is not required to be executed strictly in time-synchronization, and may therefore be done when a maintenance worker makes a time correction by a manual time adjustment.

The shift value-1 calculating unit 13 of each relay node calculates the shift value-1 by taking an average value of the frame phase differences with respect to other relay nodes which are obtained through the frame phase difference measurement by the frame phase difference measuring unit 12 (S12), and makes the shift value-1 storage unit 14 to store this value (S13). Further, the shift value-1 notifying unit 15 notifies of the shift value-1 all the switching nodes accommodated as the slaves (S14).

In each switching node 2, the shift value-2 calculating unit 23 calculates a shift value-2 by adding the frame phase difference with respect to the host relay node which has been obtained through the frame phase difference measurement, to the shift value-1 of which the host relay node has notified (S22), and makes the shift value-2 storage unit 24 to store this value (S23). Furthermore, the shift value-3 calculating unit calculates a shift value-3 per base station node by adding the frame phase difference with respect to each base station node accommodated as the slave which has been obtained through the frame phase difference measurement, to the shift value-2 (S24), and makes the shift value-3 storage unit 26 to store with this value (S25).

With the operation described above, each relay node and switching node execute, in a state of being stored with the shift values 1, 2 and 3, the phase shifts at a predetermined time specified as every target time.

In each relay node 1, the phase shift processing unit 16 reads at the predetermined time the shift value-1 previously stored in the shift value-1 storage unit 14, and executes the phase shift for correcting the frame phase difference with respect to the frame phase synchronous signal device 17 (S15).

In each switching node 2, the phase shift processing unit 28 reads at the same predetermined time as that in the relay node the shift value-2 previously stored in the shift value-2 storage unit 24, and executes the phase shift for correcting the frame phase difference with respect to the frame phase synchronous signal device 29 (S27) However, the switching node 2 controls the phase shift of the base station node 3 accommodated as the slave, and hence, before effecting the phase shift (S27) of the node itself, the phase shift processing indication unit 27 reads the shift value-3 from the shift value-3 storage unit 26, transmits the corresponding shift value-3 to each base station node 3 accommodated as the slave, and gives an indication to execute the phase shift process (S26).

In the base station node 3, when receiving the shift value-3 transmitted from the host switching node 2 at the predetermined time, the phase shift processing unit 32 executes the phase shift for correcting the frame phase difference with respect to the frame phase synchronous signal device 33 (S31).

Note that the shift value-1 is set as the average value of the frame phase differences between the relay nodes, however, if the number of nodes increases, a median or a mode may also be set as the shift value-1 in order to avoid an influence of scatter. Further, the ATM transmission line has a large scatter of delay fluctuations, and therefore an average value or a median or a mode may also be taken by carrying out the measurement a plurality of times when measuring the phase difference between the respective nodes.

In this-embodiment, the frame phase difference between the relay node and the switching nodes accommodated as the slaves, is measured in the switching node, however, this construction may be made so that the measurement is effected in the relay node. Further, the frame phase difference between the switching node and the base station nodes accommodated as the slaves, is measured in the switching node, however, this construction may be made so that measurement is implemented in the base station node.

According to the present invention, it is feasible to establish the high-accuracy frame phase synchronization within the mobile communication network because of using the ATM transmission line for measuring the transmission delay time. Further, there exists no master node for the frame phase in the network as a whole, and, because of the frame phase being determined by a statistic average between the relay nodes, the operation management is facilitated as well as increasing a redundancy of retaining the frame phase as the network. Moreover, the frame synchronization between the relay nodes is corrected by the mutual synchronizing system, while the frame synchronization between the relay node and the switching node and between the switching node and the base station node, is corrected by the master-slave system, and, with this construction, the base station does not require the phase difference calculating device, thereby exhibiting such an effect as to facilitate structuring.

What is claimed is:

1. A frame phase synchronous system for adjusting phase synchronization in a digital mobile communications system, said system comprising:

a relay node for measuring a first frame phase difference with respect to other relay nodes using a method of calculating a frame phase difference from a propagation delay time through ATM cell loop-back, for obtaining an optimum shift value as a first shift value for adjusting the phase synchronization in the relay node, and for notifying of the first shift value to a switching node connected to said relay node as a slave;

said switching node for measuring a second frame phase difference with respect to said relay node and a third frame phase difference with respect to a base station node as the slave using a the method of calculating a frame phase difference from a propagation delay time through ATM cell loop-back, for obtaining a second shift value by adding the notified first shift value to a shift value derived from the measured second frame phase difference with respect to said relay node for adjusting the phase synchronization in the switching node, and for obtaining a third shift value by adding the second shift value to a shift value derived from the measured third frame phase difference with respect to said base station node as the slave, and for notifying of the third shift value to said base station node; and said base station node for adjusting the phase synchronization by the third shift value notified by said switching node.

2. The frame phase synchronous system according to claim 1, said relay node further comprising:

a first frame phase difference adjusting unit for measuring a frame phase difference with respect to other relay nodes using the method of calculating a frame phase difference from a propagation delay time through ATM cell loop-back, and for obtaining an optimum shift value as a first shift value for adjusting the phase synchronization in the relay node; and a first shift value notifying unit for notifying of the first shift value to said switching node accommodated as a slave.

3. The frame phase synchronous system according to claim 2, said switching node further comprising:

a frame phase difference measuring unit for measuring a the second frame phase difference with respect to said relay node and the third frame phase difference with respect to said base station node accommodated as the slave using the method of calculating a frame phase difference from a propagation delay time through ATM cell loop-back;

a second frame phase difference adjusting unit for obtaining a second shift value by adding the notified first shift value to a shift value derived from the measured second frame phase difference with respect to said relay node for adjusting the phase synchronization in the switching node; and a third frame phase difference adjusting unit for obtaining a third shift value by adding the second shift value to a shift value derived from the measured third frame phase difference with respect to said base station node accommodated as the slave for notifying the third shift value as an shift value to be adjusted in the base station node.

4. The frame phase synchronous system according to claim 2, wherein said first frame phase difference adjusting unit obtains the optimum shift value, as a first shift value for adjusting the phase synchronization in the relay node, by taking an average value of the frame phase differences with respect to said plurality of other relay nodes.

5. The frame phase synchronous system according to claim 2, wherein said first frame phase difference adjusting unit obtains the optimum shift value, as a first shift value for adjusting the phase synchronization in the relay node, by taking a median of the frame phase differences with respect to said plurality of other relay nodes.

6. The frame phase synchronous system according to claim 2, wherein said first frame phase difference adjusting unit obtains the optimum shift value, as a first shift value for adjusting the phase synchronization in the relay node, by taking a mode of the frame phase differences with respect to said plurality of other relay nodes.

7. A method of frame phase synchronous in a digital mobile communications system in which a plurality of relay nodes, switching nodes as slave nodes of the relay nodes, and base station nodes as slave nodes of the switching nodes are provided, said method comprising:

measuring a frame phase difference, in a relay node, with respect to other relay nodes using a method of calculating a frame phase difference from a propagation delay time through ATM cell loop-back;

obtaining an optimum shift value as a first shift value for adjusting the phase synchronization in the relay node;

notifying the first shift value from the relay node to a switching node connected to said relay node as a slave;

measuring a first frame phase difference, in said switching node, with respect to said relay node and a second frame phase difference with respect to a base station node as the slave using the method of calculating a frame phase difference from a propagation delay time through ATM cell loop-back;

obtaining a second shift value, in said switching node, by adding the notified first shift value to a shift value derived from the measured second frame phase difference with respect to said relay node for adjusting the phase synchronization in the switching node;

obtaining a third shift value, in said switching node, by adding the second shift value to a shift value derived from the measured third frame phase difference with respect to said base station node as the slave, for notifying of the third shift value to said base station node; and adjusting the phase synchronization, in said base station node, by the third shift value notified by said switching node.

* * * * *